FIP8502 OR 3,360,666

INVENTOR
GEORGES KLEIN
BY: Paul M. Craig, Jr.
ATTORNEY

MAGNETOHYDRODYNAMIC HALL EFFECT GENERATOR

Filed July 3, 1963 4 Sheets-Sheet 2

INVENTOR
GEORGES KLEIN
BY: Paul M. Craig, Jr.
ATTORNEY

INVENTOR
GEORGES KLEIN
BY: Paul M. Craig, Jr.
ATTORNEY

INVENTOR
GEORGES KLEIN
BY: Paul M. Craig, Jr.
ATTORNEY 3,360,666
MAGNETOHYDRODYNAMIC HALL EFFECT GENERATOR
Georges Klein, Paris, France, assignor to Compagnie Generale d'Electricite, Paris, France
Filed July 3, 1963, Ser. No. 292,549
Claims priority, application France, July 4, 1962, 902,935
4 Claims. (Cl. 310—11)

ABSTRACT OF THE DISCLOSURE

A magnetohydrodynamic Hall effect generator including a combustion chamber having a conversion duct connected thereto and means for producing a transverse magnetic field in the conversion duct having a value at each point along the length of the duct proportional to the pressure of the working gases therein with the pressure of the working gases at the exhaust of the duct being lower than atmospheric pressure.

The present invention relates to the production of electrical energy by the magnetohydrodynamic effect, and in particular in generators of the type known as Hall effect generators.

The construction of a magnetohydrodynamic generator of the classic type poses numerous technical problems, one of the most important of which being the existence along the magnetohydrodynamic conversion chamber of a potential gradient, known as the Hall phenomenon, which induces a separation of electrical charges of opposite sign along the gas current, or plasma, under the effect of an electromotive force perpendicular to the flow direction of said plasma; this separation creates longitudinal electrical currents harmful to the operation of the generator. One solution of this difficulty consists in basing the extraction of the energy on the Hall phenomenon itself. This is obtained quite simply by a particular arrangement of the electrodes and their connections. These are the magnetohydrodynamic generators called "Hall effect" generators.

This Hall effect, which used to be a loss and a defect, thus becomes a quality which is looked for in this new type of generator. One will seek, then, contrary to classic generators, to increase this potential gradient. The latter increasing with the mobility of the electrons of the gas used as working fluid and with the magnetic induction B which is applied to it, gases having large mobility, such as argon as therefore used.

In order to raise the mobility still further, the apparatus can be imagined to be operated under reduced pressure. The production of a gas such as argon being quite expensive, generators have been designed in which the gaseous vein is closed on itself, and it can then be foreseen to make the argon circulate in a closed circuit under reduced pressure with appropriate heat exchangers.

The use of the hot gases from a combustion has led up to now to hyperatmospheric generators, a field in which the Hall effect is not advantageous.

In addition, for the realization of subatmospheric generators, gas aspiration at high temperature seemed a difficult problem to solve and hardly economical.

However, it has been established, and this is the object of the invention, that the advantages obtained by lowering the pressure largely compensate for the difficulties encountered in aspirating the hot gases at the exit of the generator.

The present invention therefore has for its object a magnetohydrodynamic Hall effect generator operating at low pressure and with a structure adapted to the use of combustion gases as working fluid.

The generator according to the invention uses as working fluid the combustion gases, preferably at subatmospheric pressure, seeded or not, from a very high temperature combustion, this combustion itself also being carried out at a subatmospheric pressure.

The low pressure operation of the generator according to the invention procures numerous advantages, apart from the increase in electron mobility.

The inflow to exit pressure ratio is considerably increased, a ratio on which the yield of the generator depends, by a relatively moderate lowering of pressure in absolute value.

The thermal exchanges with the walls reduce with pressure: it is then possible, in a generator according to the invention, to use cold walls, even for small installations. With high pressures, the calorific losses are enormous if the walls are cold, and the generator must be of very large dimensions to have an acceptable yield.

The mobility being considerably increased, a much smaller induction can be applied, and in particular, the induction can be limited to values less than the saturation induction of the magnetic iron sheets. Therefore, because of this fact, sufficient induction can be obtained either with simple electromagnets or by using a superconducting winding, mounted on a magnetic circuit.

On the one hand, the pressure of the hot gases progressively diminishes all along the magnetohydrodynamic conversion chamber, being given the Laplace forces to which they are submitted, this whether the gases are accelerated or not. As on the other hand the product of the induction by the mobility must not pass certain values in order to avoid encountering a harmful phenomenon called ion slide phenomenon, it is necessary to reduce the induction as and when the pressure decreases. This can be obtained for example by varying the electromagnet gap.

In other respects, the length of the generator varies as the $\frac{3}{2}$ power of the pressure, for a given magnetic field. The magnetic field therefore extends over a shorter distance, an economy which is added to the preceding one, since the field is weaker and extends over a shorter length.

The invention has equally for its object a magnetohydrodynamic generator assembly mainly remarkable in that it comprises a combustion chamber at a selectively low pressure, of the order of a few atmospheres, a magnetohydrodynamic conversion chamber working between the exhaust pressure of said combustion chamber and a pressure noticeably less than atmospheric pressure, and means for creating a depression below said conversion chamber.

As a generator according to the invention operates at pressures less than the operating pressures of classic generators, i.e., generators in which the electrical current circulates perpendicularly to the movement of the gas, it is possible to couple a generator according to the invention with such a classic generator. The invention has therefore also for its object a magnetohydrodynamic generator assembly mainly remarkable in that it comprises a combustion chamber at a pressure greater than atmospheric pressure, a first magnetohydrodynamic conversion chamber working between the combustion chamber pressure and a pressure in the neighborhood of atmospheric pressure, the electrical current being picked up in this chamber perpendicularly to the gas flux. A second magnetohydrodynamic conversion chamber is provided working between said pressure in the neighborhood of one atmosphere and a pressure clearly less than the atmospheric pressure, the current being picked up in this chamber, in the direction of the gas flux, and means for creating a reduced pressure below said second conversion chamber.

Other characteristics of the present invention will appear in the course of the following description.

In the drawings,

FIGURE 1 schematically represents in axial section the combustion chamber and the magnetohydrodynamic channel;

FIGURE 2 schematically represents the electrode coupling system in a Hall effect generator;

Figure 5:
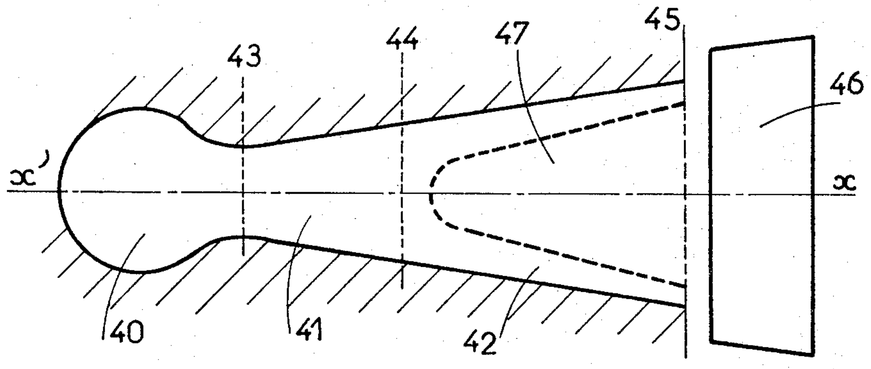
Figure 6:
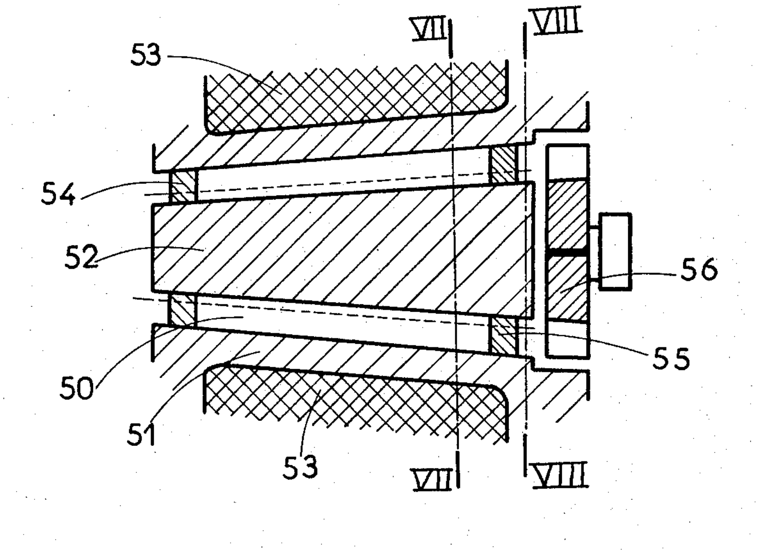
Figure 7:
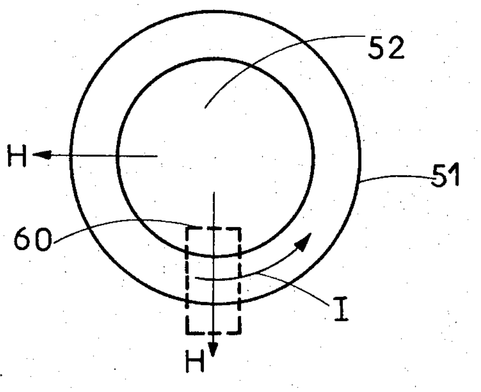
Figure 12:
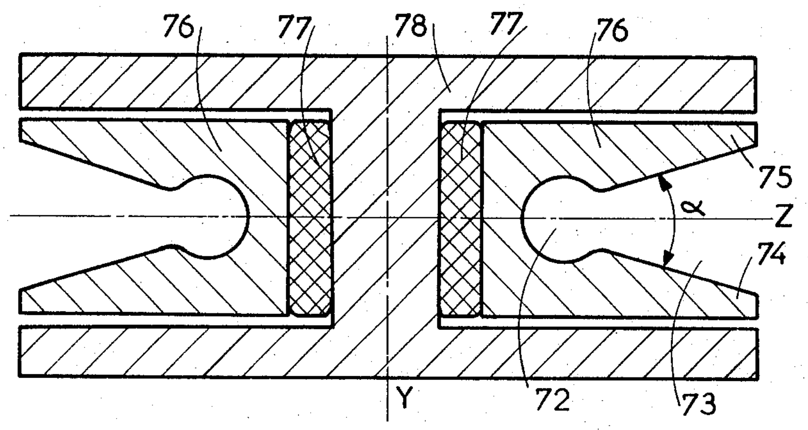
Figure 11:
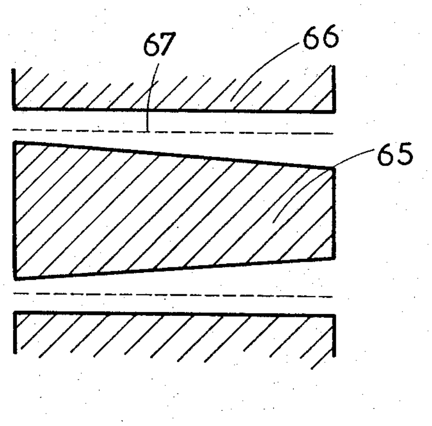
Figure 10:
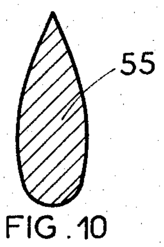
Figure 9:
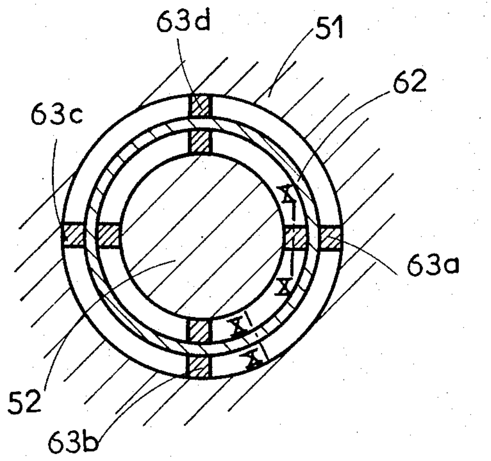
Figure 8:
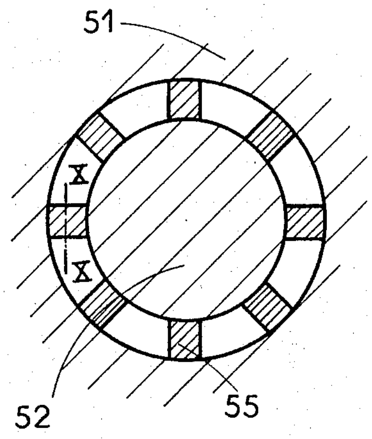

FIGURE 5 schematically represents a generator assembly according to the invention;

FIGURE 6 represents in axial section an installation according to the invention;

FIGURE 7 is a section following the line VII—VII of FIGURE 6;

FIGURE 8 is a section following the line VIII—VIII of FIGURE 6;

FIGURE 9 is an analogous view of FIGURE 8 for a variant;

FIGURE 10 shows an electrode profiled in section following one of the lines X—X, in FIGURE 8 or in FIGURE 9;

FIGURE 11 shows another form of conversion chamber analogous to that of FIGURE 6; and FIGURE 12 shows yet another form of conversion chamber.

Figure 1:
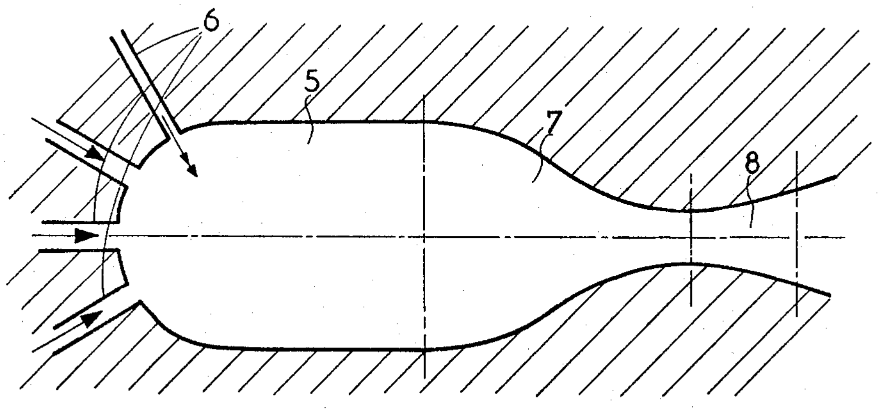

In FIGURE 1, the magnetohydrodynamic generator duct comprises a combustion chamber 5 which is fed by way of passages 6 with the gases necessary for combustion, or fuels such as oils, natural gases, crushed coal, any similar or other hydrocarbons, combustives such as oxygen or air, compressed or not, as well as seeding materials, such as salts of alkaline metals of small ionisation potential such as potassium, calcium, or sodium.

The combustion chamber can be at a subatmospheric pressure, for example, of the order of 0.4 atmosphere, or at a higher pressure, of the order of 0.4 atmosphere, or at a higher pressure, of the order of atmospheric pressure or even a few atmospheres. In the case where the chamber is at a subatmospheric pressure, the necessity of having to inject the carburant under pressure is avoided and this does not then necessitate a slackening-off which would have the effect of cooling the gases and in some cases of reducing the yield of the generator.

The gases are aspirated and accelerated by a pipe 7 which takes them up to speeds greater than Mach 0.5. They then emerge into the magnetohydrodynamic conversion chamber 8 whose shape is slightly divergent, and in which a quite intense magnetic field has been created. It is in this chamber that the conversion of gas energy to electrical energy is carried out.

Figure 2:
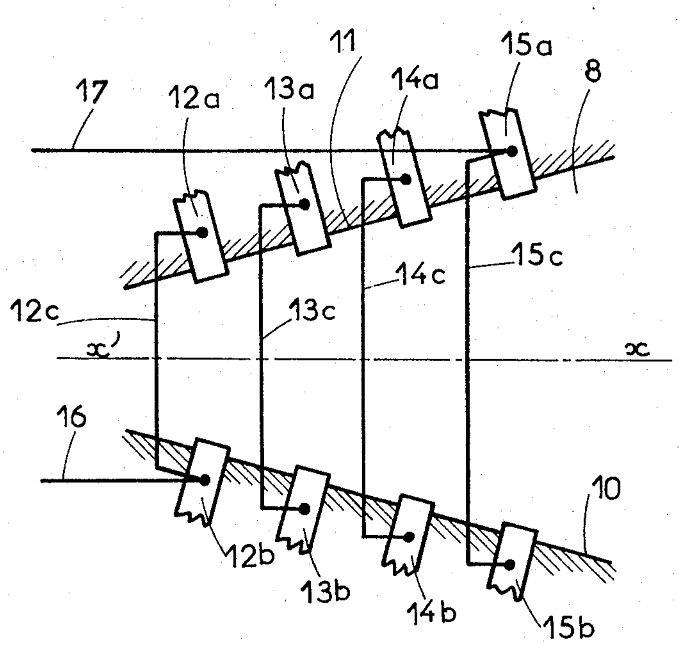

FIGURE 2 shows as an example the manner in which the electrodes of a Hall effect generator can be connected. The gaseous current follows the vein in the direction $x'$–$x$, and the magnetic field is directed perpendicularly to the plane of the figure. The vein 8 has a divergent profile and sensibly rectangular sections. The potential difference therefore appears on the lower and upper walls 10 and 11. The electrodes are arranged in pairs opposite each other *12a*, *12b*, *13a*, *13b* . . . *15a*, *15b*. There thus can be a number of electrode pairs and often as many as several multiples. The electrodes in pairs are short circuited by conductors *12c* . . . *15c*. Currents are therefor developed in the circuits *12a*, *12b*, *12c* . . . *15a*, *15b*, *15c*, which are necessary to the operation of the Hall effect generator. It is necessary to loop in short circuit the transverse currents for the operation of the generator to obtain Laplace forces. The current produced by the generator is picked up between the electrodes 12 and 15, by conductors 16 and 17.

The intermediate electrodes which only serve to loop in short circuit the transverse currents can be different from the extreme or pick-up electrodes. In particular the electrodes can be realized following the different technologies. The looping electrodes work with small potential drops therefore they are necessarily hot and thermionic. A close network is necessary. On the contrary, the pick-up electrodes can be spaced, the voltages are greater and the intensities are smaller, cold electrodes can be envisaged, for example, cooled metallic electrodes. In fact, it is not too serious to lose 100 volts out of 10,000 volts but on the contrary on the looping electrodes, it is well understood that a loss of 100 volts, for example, out of 120 is not acceptable.

Figure 3:
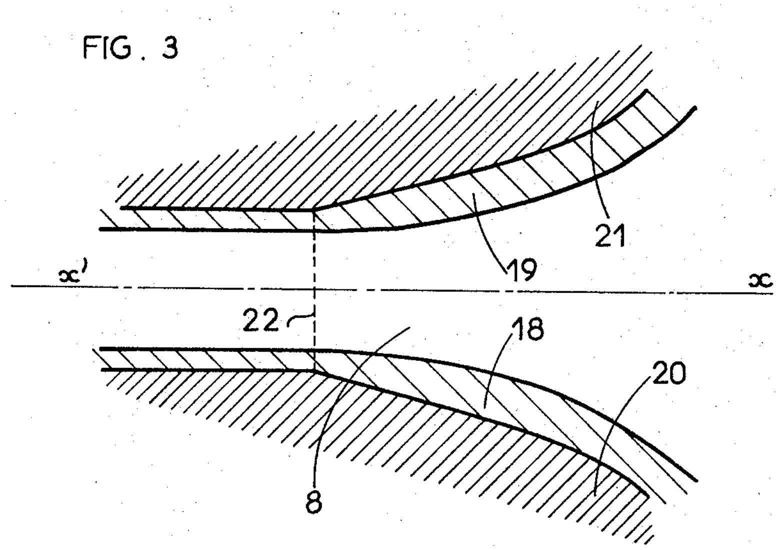
FIGURE 3 shows a possible magnet gap shape for the channel of the generator in axial section.

FIGURE 3 shows an example of air-gap shape. The line $x'$–$x$ here designates also the axis of symmetry of the vein, the gas flow being in the direction $x'$ to $x$. In this embodiment, the vein has rectangular sections, of variable dimensions following the $x'$–$x$ axis, the profile being, for example, the one represented in FIGURE 3 by the walls 18 and 19. These walls can be of insulating, refractory or similar material, comprising cooling means or not and constructed in order to withstand the high temperatures in the chamber. In the figure portions 20 and 21 represent the metallic armatures of the electromagnet necessary to obtain the field in the conversion chamber; as is seen in this figure, in the required left part of the drawing, the air-gap has a constant value and it continues diverging towards the right in the figure. In the constant air-gap part to the left of line 22, the induction has not yet reached the critical value. Past the line 22, the pressure in the gas has lowered sufficiently and as a result the induction must have a smaller value, which leads to the air-gap being increased. The air-gap widens so as to maintain a constant magnetic induction to pressure ratio. Advantageously, the coefficient B, i.e., the product of the induction by the mobility of the electrons maintains a value comprised between 2 and 30, and preferably between 5 and 15; this coefficient is dimensionless, and represents the mean deviation angle of the electrons between two shocks in radians.

Figure 4:
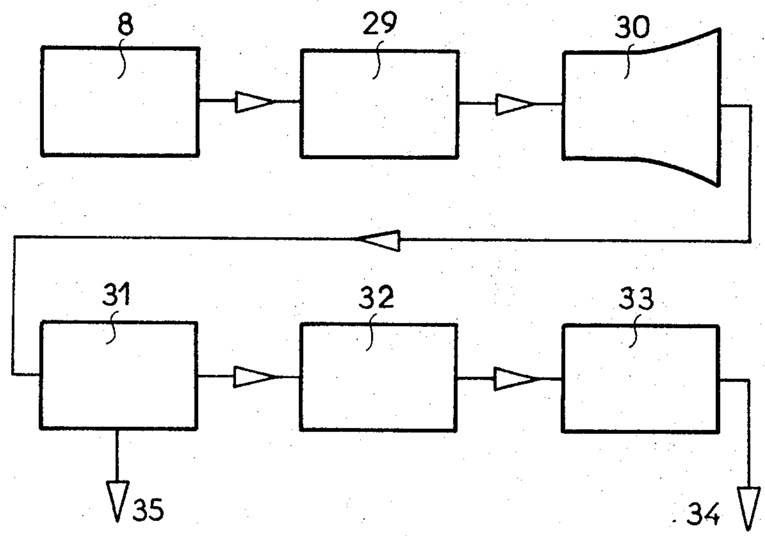
FIGURE 4 shows in a synoptic manner a complete magnetohydrodynamic installation.

FIGURE 4 represents the device below the gas circuit after combustion. Leaving the magnetohydrodynamic chamber 8, the gases pass through a heat exchanger 29 in order to recover their thermal energy, then through a diffuser 30 which recovers the remaining kinetic energy, then through a purifier 31, which comprises an extractor 15 to recover the seed, then in a refrigerator 32, finally through a compressor 33, before being ejected into the atmosphere in 34.

In this embodiment, the reduced pressure and the circulation of the gases are therefore uniquely assured by a compressor downstream of the generator to the exclusion of a compressor upstream thereof, as in the devices which can be called classic in magnetohydrodynamics.

FIGURE 5 represents very schematically a generator assembly conforming to the present invention. It is principally constituted by a combustion chamber 40, at higher pressure than atmospheric, by a divergent pipe principally comprising two zones, a zone 41 between the sections 43 and 44 and a zone 42 between the sections 44 and 45, in which the electrodes are mounted in different ways. The first chamber 41 situated directly at the combustion chamber exhaust 40 operates at a pressure greater than atmospheric pressure, between the pressure at the combustion chamber exhaust 40, a pressure which can be of the order of a few atmospheres in the section 43, and a pressure, near the section 44, which can be of the order of 1 atmosphere, or less, such as 0.3 atmosphere for example. This part 41 of the pipe is advantageously organised for operating as a classic generator, i.e. a generator in which the electrical current is picked up in a direction perpendicular to the gas flow direction. The part 42 of the pipe, on the contrary, is advantageously organised for operating by drawing on the Hall effect. It therefore works between the section 44 at a pressure in the neighborhood/or less than atmospheric pressure and the pressure in the exhaust section 45, a pressure which can be in the order of 0.1 to 0.2 atmosphere. In the figure element 46 schematically represents aspiration means for driving the gases back either into the atmosphere or towards exchangers or other apparatus in order to recover the calories or the energy still available in the gas. The section of the duct represented in FIGURE 5 can be round, rectangular or otherwise. It can in particular be annular in the chamber 42, the central space being occupied by a core 47 of appropriate shape comprising, if desirable, a pole piece in ferrous metal, with or without winding, a Hall effect conversion chamber is therefore combined with a classic conversion chamber, the two chambers working at different pressures, each having a better yield in its pressure range. The aspiration means 46 can be of any appropriate type. The gases can be cooled before being aspirated, for example in a boiler or another installation in order to recover the calories and are only aspirated when their temperature has dropped sufficiently. The hot gases may also be aspirated directly, for example by a pump such as a liquid ring pump, a liquid ejector or a similar pump. The gases may also be aspirated by a fan, a vane wheel or similar means. It has been stated that the necessity of having a compressor for driving out was largely compensated for by the advantages drawn from the yield increase. In an assembly such as that in FIGURE 5, it is possible to have a very high relaxation ratio between the sections 43 and 45, because of the fact that the pressure 45 is very low. Thus, if there is a pressure of 5 atmospheres at section 43 and a pressure of 0.1 atmosphere at section 45 a ratio of 50 is obtained. In order to have a ratio comparable with an apparatus which drives out the gases into the atmosphere without a compressor, i.e. with a final pressure of 1 atmosphere, it would be necessary to have a pressure of 50 atmospheres in the combustion chamber.

It is seen immediately that this involves considerable complications of construction, and that in addition, the thermal exchangers between the gas and the walls are increased by very large amounts.

FIGURE 6 represents schematically in axial section a ring vein Hall effect magnetohydrodynamic generator. The vein 50 is comprised between an exterior conic wall 51, and an interior conic wall 52 forming the core. The two conic walls are coaxial the angles at the tip of the cones being equal or different, the two being divergent or convergent. In fact, the increase of the average diameter of the annular vein leads, if the spacing of the walls stays the same, to an increase of the section which then depends on the angle at the tip of the cone. The section may be varied by changing the angles of the cones which can bring them together or space them apart. Should the occasion arise, the walls may diverge from the conic shape. In the figure element 53 schematically represents the electromagnet winding, and elements 54 and 55 represents the current pick-up electrodes. The annular shape of the conversion chamber allows the easy adaptation of an annular effect aspiration device, such as for example, a fan wheel 56 or similar device.

FIGURE 7 represents a section perpendicular to the axis of the chamber in FIGURE 6. The windings and the electromagnet are arranged in such a generator in order to have a radial field represented following two directions in FIGURE 7 by the arrows H. The transversal or azimuthal currents are therefore in this case directed following the general circular orientation. They are represented in FIGURE 7 by the arrow I. The transversal currents are indispensable for creating Laplace forces in order to obtain an intense electric field and to displace the electrons in the direction of the gaseous current. It is therefore necessary to loop them in short circuit for the operation of the generator. In a radial generator such as the one represented in the FIGURES 6 and 7 it is seen that to realize this looping, it is not necessary to arrange particular electrodes since the looping currents generate themselves in the gaseous medium while turning in the very interior of the generator. A slice of the generator in FIGURE 6 has been represented following the dotted frame 60. If this slice is sufficiently small, the field H may be considered as parallel to a given direction and the currents I perpendicular to this direction, one is therefore brought back in this case to the general arrangement used in the classic generators and one notes that a ring generator behaves as a series of juxtaposed classic generators, arranged in a circle.

FIGURE 8 shows a possible position for the current pick-up electrodes in the case of the generator in FIGURE 6. The electrodes completely cross the gaseous vein. They may advantageously have an aerodynamically profiled section, as represented in FIGURE 10. The electrodes may also be arranged as shown in FIGURE 9, an annular electrode 62, whose section may also be like the one represented in FIGURE 10 and held in place in the middle of the annular vein by a number of supports 63A, 63B, etc. being able to act equally the role of electrodes, in complement to the electrode 62.

FIGURE 11 schematically represents another annular magnetohydrodynamic conversion chamber constituted by the space comprised between two coaxial cones 65, 66, the median surface being a cylinder 67, being non-divergent in consequence.

The electrodes shown in FIGURES 8 and 9 can be cooled, should the occasion arise, by an appropriate liquid or gas circulation, for example by water, and thus serve to warm water. FIGURE 12 represents in section another possible magnetohydrodynamic generator arrangement. This generator is formed by revolution around the Y axis. It comprises an annular combustion chamber 72 and a magnetohydrodynamic conversion chamber 73. This chamber is constituted by the space comprised between two conic walls 74 and 75, with revolution around the Y axis and symmetrical one to another with respect to the plane Z perpendicular to the Y axis and passing through the center of the combustion chamber 72. The angle $\alpha$ which the generators of the two cones make between them in a plane passing through the Y axis can have any appropriate value, the fulfilling case being zero or even negative, i.e. the two walls may approach each other on the outside: in fact, if the value of an annular section of the conversion chamber is examined, at a certain ray of the Y axis, one of the growth factors of this section is the ray starting from the Y axis. If therefore the angle $\alpha$ is zero, this section increases on going away from the Y axis, one may rely on this increase of the section through the angle $\alpha$. If the section is diverging too quickly from the Y axis, a negative angle $\alpha$ allows this increase to be corrected. In the figure element 76 represents the chamber walls, in refractory or similar material, element 77 the windings and element 78 the magnetic circuit.

The invention could be applied advantageously to the propulsion pipes of space engines in which the exhaust gases are at very high temperature and which emerge practically in a vacuum. It is then possible in this case to recover large quantities of electrical energy, the construction of the generator being simpled in the extreme.

Naturally the invention is in no way limited to the embodiments more particularly described and shown which have only been given as examples. In particular one may, without departing from the outline of the present invention, bring modifications of detail to it, change some devices or replace some means by equivalent means.

I claim:

1. A Hall effect magnetohydrodynamic generator including a combustion chamber for producing hot ionized working gases, a conversion duct provided with electrodes, means for feeding hot ionized working gases from the combustion chamber into the conversion duct, an electromagnet for producing a transverse magnetic field in the conversion duct and means for extracting the ionized gases from the conversion duct such that the pressure of working gases at the exhaust of the conversion duct is lower than atmospheric pressure, said electromagnet being arranged to produce in the duct a magnetic field smaller than 20,000 gauss and having at each point, along the length of the conversion duct, a value proportional to the pressure of the working gases.

2. A generator according to claim 1, wherein the arrangement is such that in operation of the generator, the product of the magnetic flux density and electron mobility of the working gases is at each point along the length of the conversion duct between 2 and 30.

3. A generator according to claim 2, wherein the shape and width of the air-gap of the electromagnet varies along the length of the duct to obtain a variation of the magnetic field along the length of said duct.

4. A generator according to claim 2, wherein the product of the magnetic flux density and electron mobility of the working gases at each point along the length of the conversion duct is between 5 and 15.

References Cited

UNITED STATES PATENTS 2,210,918 8/1940 Karlovitz et al. -------- 310—11
3,149,247 9/1964 Cobine et al. ---------- 310—11
3,183,379 5/1965 Horwitz -------------- 310—11

OTHER REFERENCES

Engineering Aspects of Magnetohydrodynamic, edited by Mather and Sutton; published by Gordon and Breach, New York and London; pp. 187 to 197, paper by Karlovitz et al. in 3rd symposium at Rochester, N.Y., March 1966.

DAVID X. SLINEY, *Primary Examiner.*